March 17, 1970     B. M. LIDE III     3,501,237
APPARATUS FOR AND METHOD OF DETERMINING TEMPERATURE
Filed April 28, 1964     10 Sheets-Sheet 3

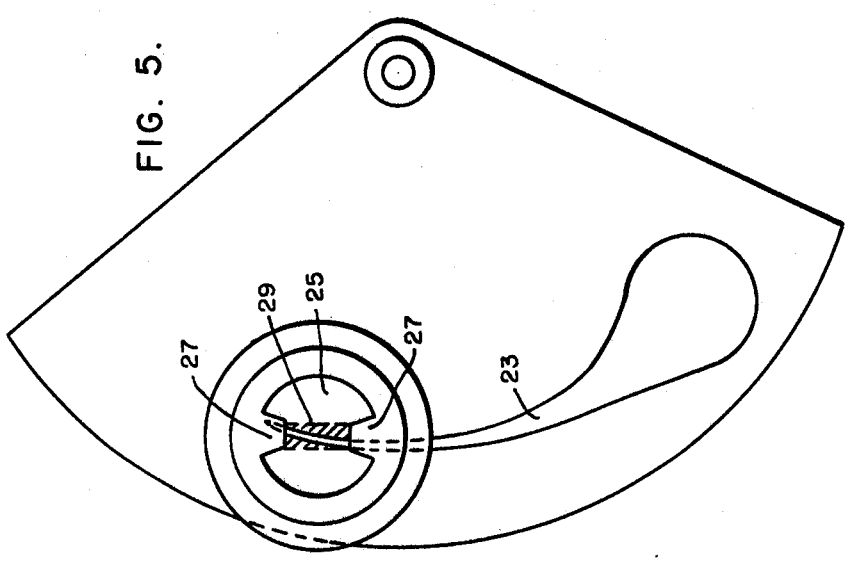
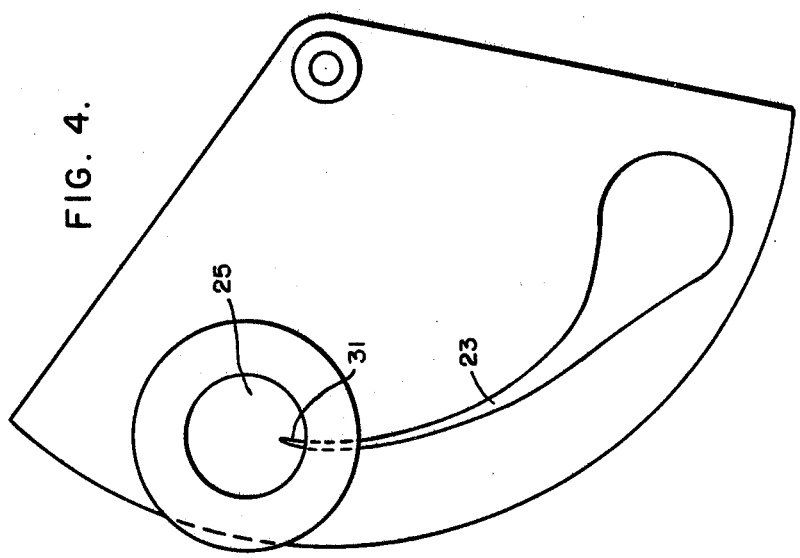

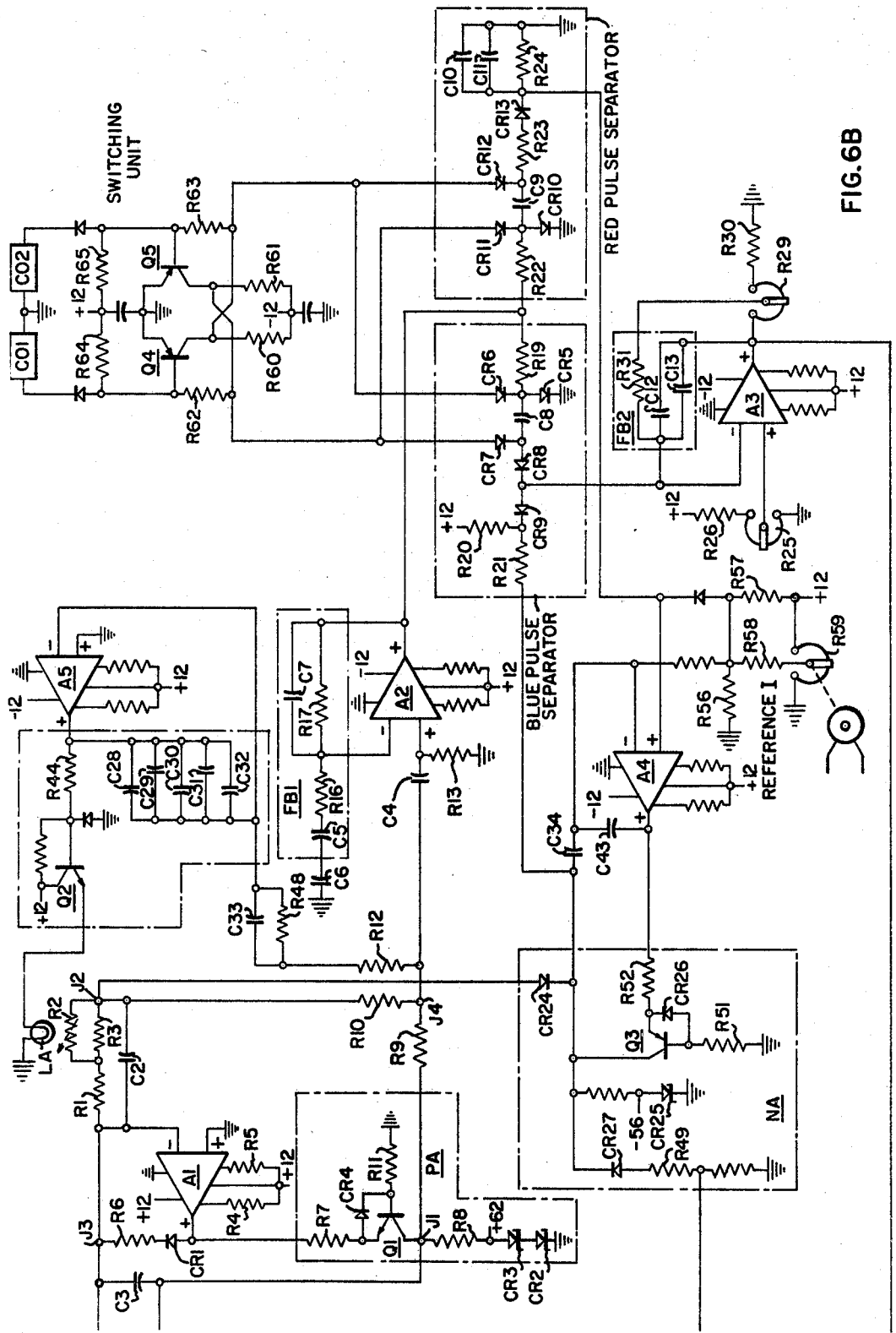

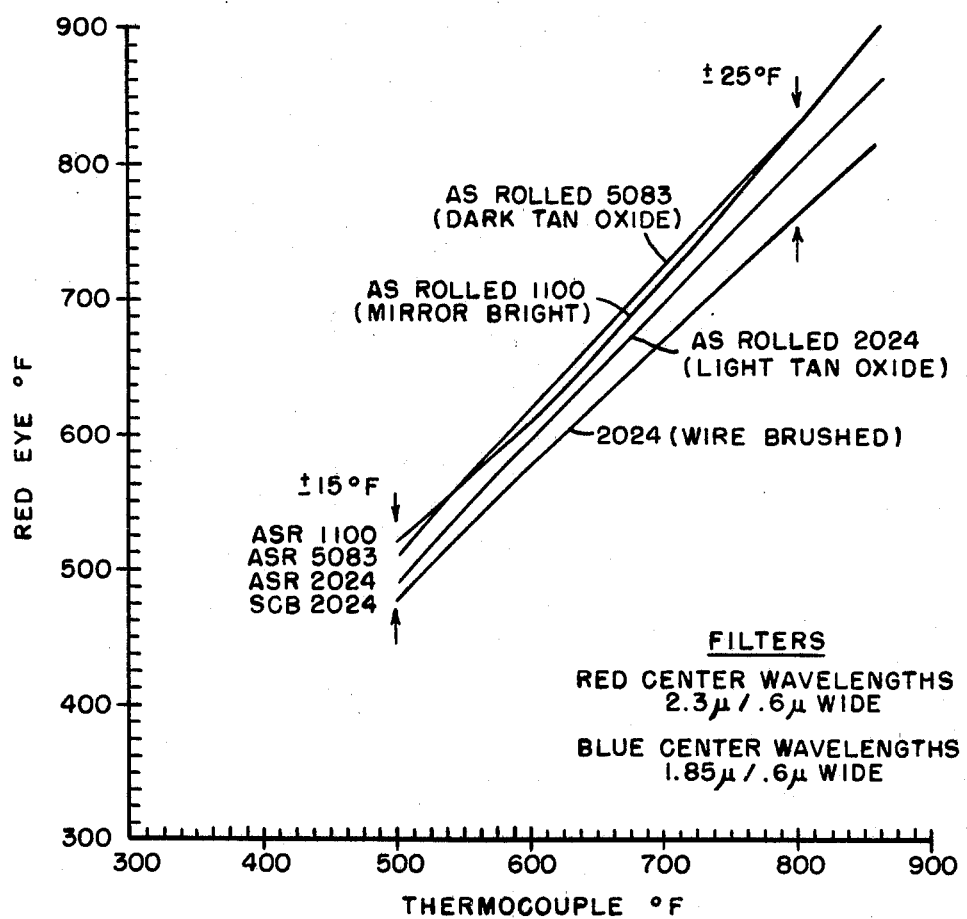

United States Patent Office 3,501,237
Patented Mar. 17, 1970

3,501,237
APPARATUS FOR AND METHOD OF DETERMINING TEMPERATURE
Basil M. Lide III, Pittsburgh, Pa., assignor, by mesne assignments, to Industrial Development Fund, a Pennsylvania development credit corporation
Filed Apr. 28, 1964, Ser. No. 363,093
Int. Cl. G01j 5/60
U.S. Cl. 356—45
19 Claims

ABSTRACT OF THE DISCLOSURE

A plural wavelength radiation pyrometer including a photo-conductive element (Exposed Cell; FIG. 6A) subject for short time intervals, determined by rotating disc FD (FIG. 2), to radiation in the two wavelengths (called red and blue) through filters FR and FB. The Cell is connected in a bridge (FIG. 6B) including the Cell, a compensating photo-resistor R2, controlled by lamp LA, and resistors R9 and R10. The bridge has input terminals J1, J2 and output terminals J3, J4. The output terminals are connected through amplifiers A1 and PA in a feedback network to maintain point J3 at ground potential and through A2, Red Pulse Separator, A4, NA, in a feedback network to maintain the magnitude of the red electrical signal constant. The temperature is measured by meter M1 (FIG. 6A) in circuit: A2, Blue Pulse Separator, A3, M1.

---

This application relates to the art of determining temperature and has particular relationship to the determination of temperature by measuring the ratio of the relative intensities of radiation, from the body or object under observation, at a plurality—usually two—different wavelengths. Apparatus for accomplishing this purpose is sometimes referred to in the art as a two-wavelength pyrometer.

There has for a long time existed a largely unsatisfied need in the industries which process materials at moderate and high temperatures to determine precisely the temperatures of the materials as they are processed, without contact between the material and the measuring device. Such a need has existed in the metal, glass, ceramic industries and the like. It is an object of this invention to meet this need and to solve related problems by enabling the determination of temperatures reliably over a wide range extending particularly to relatively low temperatures of the order of several hundred to one thousand degrees. Specifically, it is an object of this invention to provide apparatus and a method for accomplishing this purpose by applying two-wavelength pyrometry.

Attempts to measure temperature by two-wavelength pyrometry in accordance with the teachings of the prior art have not been successful. The apparatus provided for this purpose has lacked the sensitivity, reliability and precision demanded. It is then an object of this invention to overcome the drawbacks of the prior art and to provide reliable and precise apparatus and a method for determining temperature by two-wavelength pyrometry. Another object of this invention is to provide such apparatus which shall be highly stable and shall not drift from its settings.

An ancillary object of this invention is to provide novel photo-responsive apparatus having particular and intimate applicability to two-wavelength pyrometry but also capable of serving other purposes. Another ancillary object of this invention is to provide a novel calibrating device for photo-responsive apparatus. A further ancillary object of this invention is to provide a novel synchronous switching mechanism. Still another ancillary object of this invention is to provide a novel motor-control circuit. A still further ancillary object of this invention is to provide a novel filtering mechanism particularly applicable to two wavelength pyrometry.

This invention in its broad aspects arises from the realization that local conditions on the body whose temperature is being measured or in the environment of this body may deleteriously affect the precision of the temperature measurement. Such materials as aluminum, magnesium or chromium have a layer of oxide on their surface. In the measurement of the temperature of these materials and of related materials such as stainless steel, the radiation measured is not the radiation of the material but the complexly combined radiation of the material and its surface oxide. The radiation from this surface oxide plays an important role in determining the character of the combined radiation. The same comment applies to other ferrous materials such as steel which during rolling may have a layer of mill scale or $Fe_2O_3$ or $Fe_3O_4$ on its surface.

It has been realized that the oxide may radiate selectively; that is, they may have resonance peaks so that the intensity of the radiation changes markedly as a function of the wavelength. Where the measurement depends on measurement of intensity in selected wavelength bands the selectivity of the oxide radiation may seriously impair the precision of the determination. For example, if one of the bands is in, or very near, a resonance peak produced by the oxide, the ratio of the intensities may be high or low, not because of corresponding temperature of the body under measurement, but because the resonance peak is high. A like effect is produced by the gases through which the radiation passes. For example, water vapor has absorption bands in the infrared and if the wavelengths selected for determining temperature are in these bands, low or high readings having no important correlation to the temperature my be obtained.

In accordance with this invention in one of its aspects the temperature determining bands are selected in parts of the spectrum of the radiation emitted by the body which are not in or near the resonance peaks or the absorption bands of environmental gases. In accordance with this invention in another of its aspects the measurement bands may be selected so near to each other, in the spectrum of the body, that both bands fall in a resonance peak of the radiation emitted or in an absorption band of the surrounding gases. In each case the peaks and absorption bands may be determined experimentally or from a table and the measurement bands selected accordingly. The selection of temperature determining bands very near each other is limited by the condition that as the selected bands approach each other the ratio of the intensities approaches 1.

In accordance with a further aspect of this invention, the radiation in the two-wavelength bands, selected as described above, and which determines the temperature sought, impinges on photo-sensitive means which is connected in a balanced compensated network. Specifically, the photo-sensitive means may be a photo-conductive cell or element. This cell or element is compensated by a conductor which in these properties, that are critical to the determination of the intensity of the radiation, matches the cell. Specifically, the compensating conductor may be a second photo-conductive cell matching the cell on which the radiation impinges and subjected to controlled radiation so that it effectively performs its compensating function. In certain situations the compensating cell may also be conveniently subjected to constant radiation maintained dark; that is, enclosed in a closed chamber with radiation absorbing walls to accumulate a black-body.

The photo-conductive element and compensating conductor are connected in two arms of a bridge network; impedances which may be resistive are connected in the other arms. The input terminals to this network may be defined as the respective junctions of one impedance and the photo-conductive cell, and of the other impedance and the compensating conductor; the output terminals may be defined as the respective junctions of the cell and the compensating conductor and of the impedance. A feature of this invention, in its specific aspects, is that the compensating conductor is varied so as to compensate for the tendency of the network to drift from balance. Such drift may predominately be caused by drift of the cell. The compensating conductor thus operates to maintain the network in static balance.

The compensating conductor is supplied in a servo loop that responds to any slow unbalance in the network to reduce the unbalance. Specifically, this loop may include an auxiliary radiation source, the intensity of which is maintained in a manner proportional to the unbalance. This source controls a photo-conductive cell connected in one of the arms of the bridge network so as to balance the bridge network. A separate cell may, and preferably is, used for this purpose, but in accordance with an aspect of this invention this auxiliary source may produce the balance by controlling the cell already exposed to the radiation being measured. The signals proportional to the radiation in the two wavelengths emitted from the object appear dynamically as pulses of unbalance across the output terminals of the network.

The pulses for the two wavelengths produce corresponding DC signals created by separating the trains of pulses for one wavelength from the pulses for the other and smoothing each train of pulses. The signal for one wavelength is maintained constant by appropriate setting of the input potential to the network. The other signal is permitted to vary and its magnitude is measured. This signal is proportional to the ratio of the input radiation energies at the two wavelengths and measures the temperature. To understand this let the input radiation for which the signal is permitted to vary be A and the other input radiation energy be B.

Let $A/B=R$.

Let $x$ be a factor introduced by the apparatus such that as B varies, $XB=K$, a constant.

Then $xA/xB=R=xA/K$.

That is $xA$ is a measure of $A/B$; $xA$ is the output of the apparatus which is measured.

The network is in static balance and maintained so by the compensating conductor. The variations in input potential do not then appear in the output and do not exert an effect on the output.

The output signal which is maintained constant, and from which the input potential to the network is derived, is itself derived from a train of pulses which is smoothed out. But to achieve reasonably fast response of the apparatus the time-constant of the smoothing reactance must be reasonably low. The output signal, and the input potential to the network, then has a ripple of substantial amplitude compared to the pulse amplitude. Typically the input potential to the network may have a ripple of 25 millivolt amplitude while the pulses may have an amplitude of 6 millivolts. Because the network is maintained automatically balanced the ripple does not appear at the output terminals of the network.

Another feature of this invention is that the input potential to this network is determined by the output and is preferably so set that the output terminals are maintained at ground potential, or at a selected reference potential, and the cell is supplied with constant current determined by the network-supply voltage. As the cell resistance varies with the radiation, the output pulses are proportional only to the change of cell resistance. Linearity is thus achieved.

Specifically, according to this invention amplifying means is provided the input of which is supplied from the junction of the exposed cell and compensating conductor and the output of which is connected in feed-back relationship to the input terminals of the network. This output of the amplifier also contains the indications for the energy of the two wavebands of the temperature measured.

In the preferred practice of this invention the range over which the exposed cell operates is limited, to the linear portion of the cell characteristic, for each body under observation in accordance with the intensity of the radiation emitted from the body. When this intensity is high the radiation from the body transmitted to the exposed cell is materially restricted; where the intensity of the body is low the radiation transmitted is less restricted. This control is effected by a motor-controlled slotted plate which has the effect of an iris. The plate is interposed between the body and the exposed cell. The slot is tapered and curved so that the area of the opening in the slot varies along the slot from a large area, through which there is substantial transmission, to a small area through which the transmission is small. The motor operates responsive to the magnitude of the radiation emitted by the body to set the slot to an area of transmission inversely related to this magnitude. A measure of the magnitude of radiation is the input potential to the bridge network and the motor may, in accordance with this invention, be controlled in accordance with this potential. The tapered slot may be replaced by a motor-controlled camera iris at the opening in the housing of the exposed cell.

In accordance with an aspect of this invention a novel switching or gating circuit is provided for the pulse channels. This circuit includes a flip-flop which is flopped from one condition to the other in synchronism with the exposure of the cell to the bands. In one condition of the flip-flop a diode in the channel through which the signal for one band may pass is blocked and the corresponding diode in the other channel is conducting; the converse occurs for the other condition of the flip-flop.

In the typical practice of this invention the exposed cell is maintained at a substantially constant temperature in an enclosure which has an opening through which the exposure of the cell takes place. The necessity for maintaining the cell at a constant temperature arises from the discovery of the importance, as regards precision, of the variation of the spectral response of the cell with its temperature; to stabilize this response the temperature must be constant. The cell is exposed through filters typically mounted in a disc rotated between the body under observation and the cell so that the cell is exposed to the radiation in the two bands in succession. The filters are selected on the basis of the above teaching.

Another feature of this invention arises from the discovery that the reliability and precision of the apparatus may be deleteriously affected by the radiation from the part of the disc between the filters. This radiation depends on the temperature of the disc and may change materially with ambient temperature. In accordance with an aspect of this invention the disc is highly reflective on the side facing the cell so that the cell is affected only by its image on the portion of the disc between filters.

In the use of this apparatus temperature measurements have been made over the following ranges:

350° F.–1100° F.
500° F.–1000° F.
500° F.–1500° F.
600° F.–1350° F.

Where the filter attenuation was found inadequate to maintain operation of the cell under similar output conditions for both waveband energies screens were inserted in the transmission path between the body or object under observation and one of the filters. Comparison with thermocouple measurements revealed that the tempreatures measured by the apparatus according to this invention corresponded to the thermocouple measurements with ±5 to 10° F.

The novel features considered characteristic of this invention are described generally above. For a clearer understanding of this invention, both as to its organization and as to its method of operation, together with additional objects and advantages thereof, reference is made to the following description of a specific embodiment taken in connection with the accompanying drawings, in which:

FIGS. 4 and 5 are fragmental diagrammatic views, looking from the cell side of the lens, for explaining a specific aspect of this invention involving the low area portion of the radiation-restrictor slot and the lens through which the radiation passes;

Figure 6A:
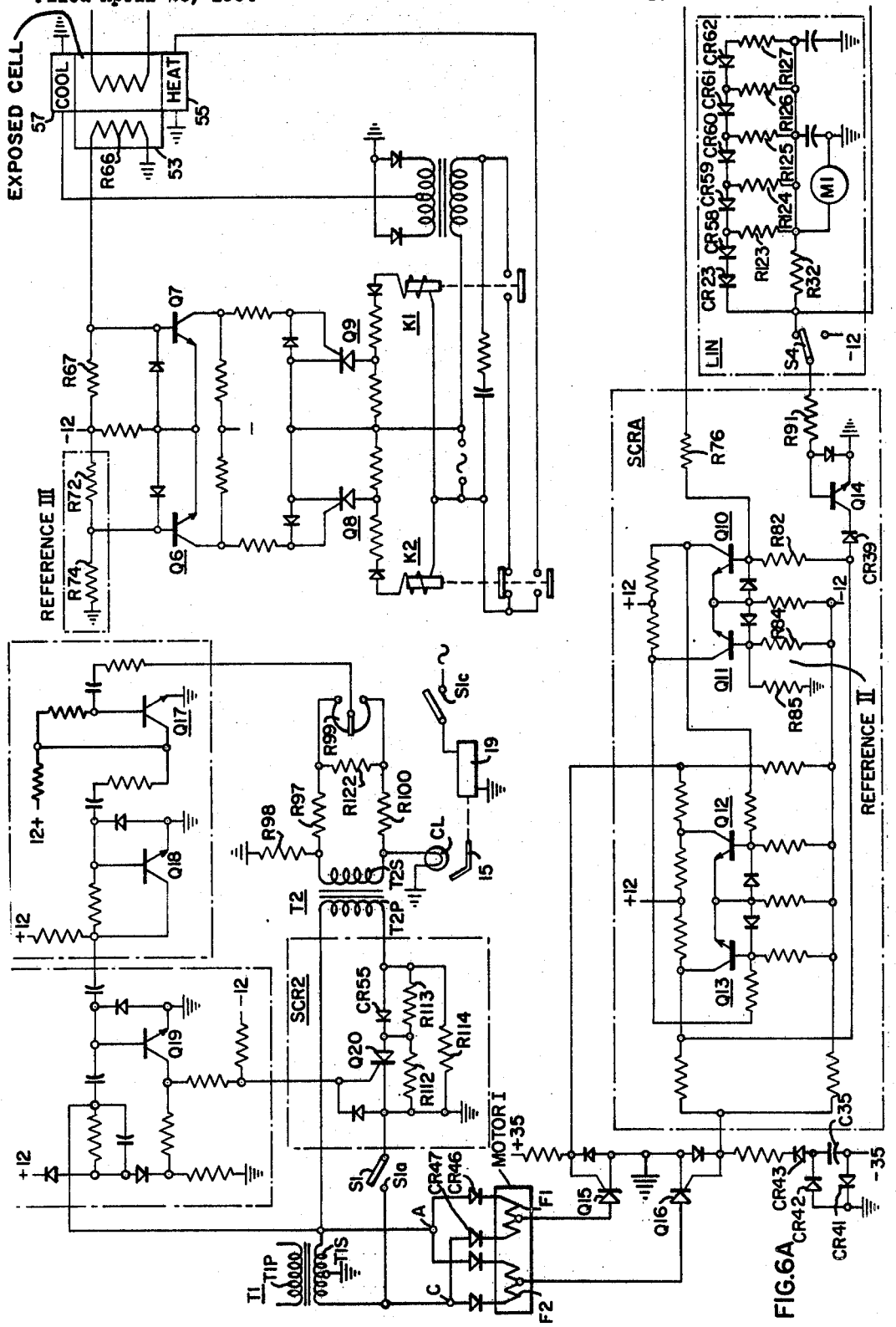
Figure 7A:
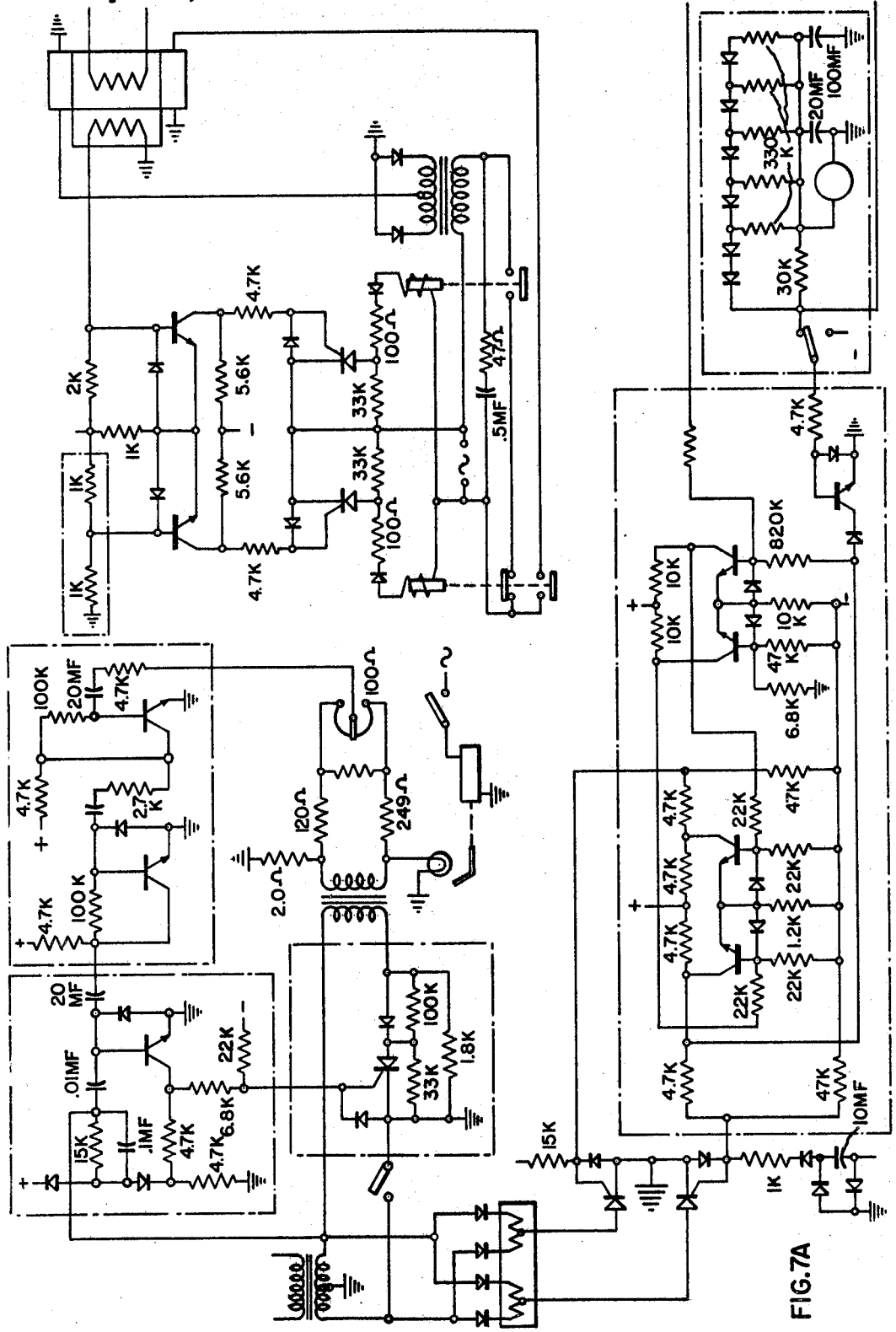
Figure 7B:
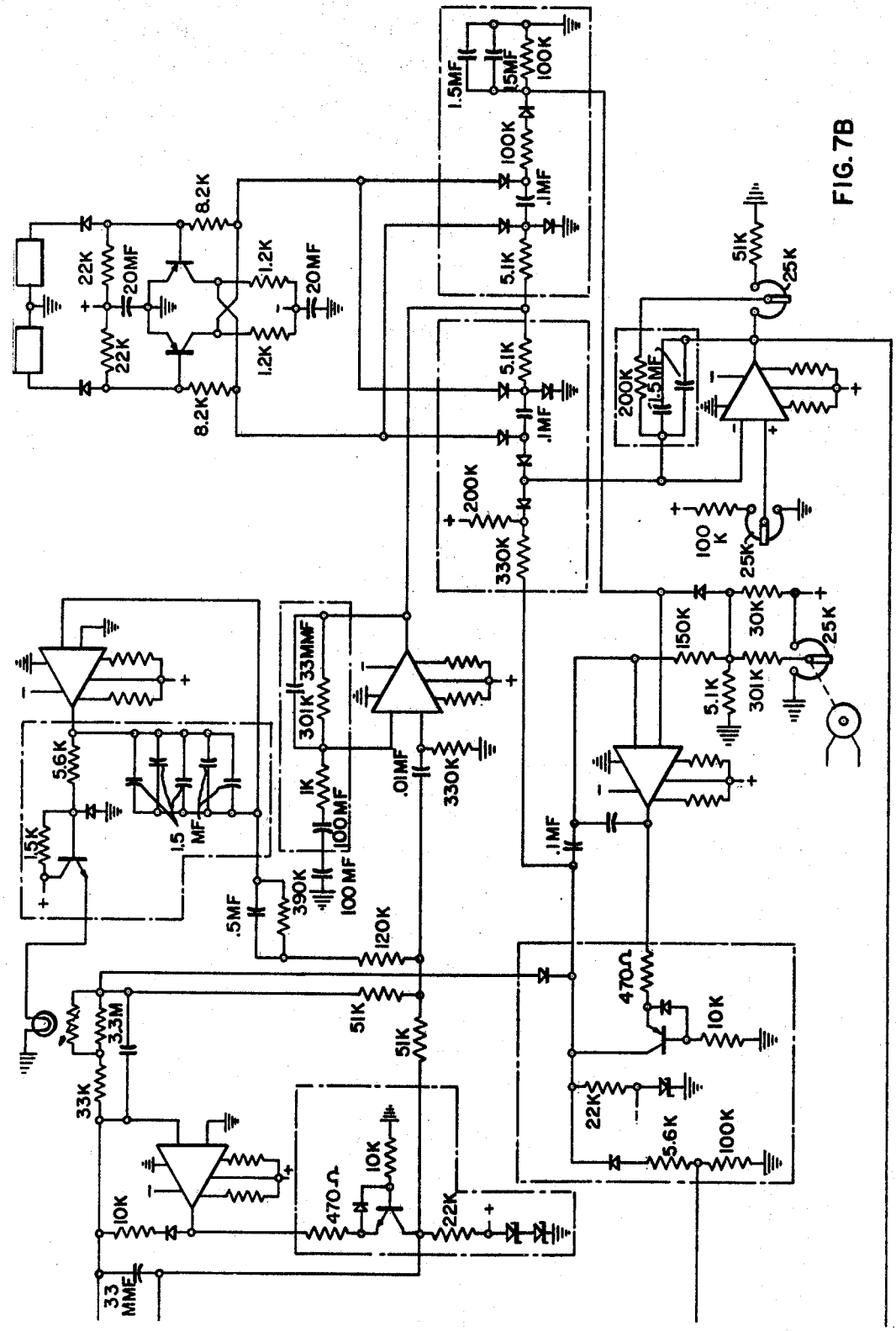
Figure 8:
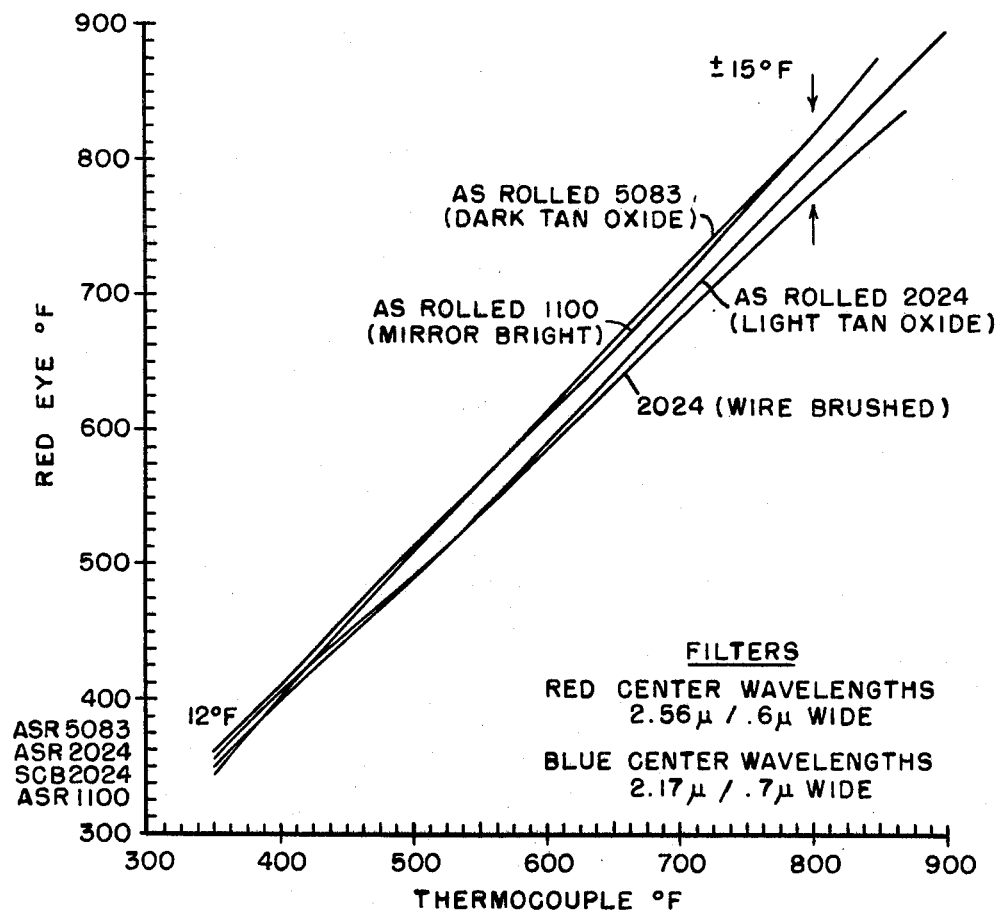

FIGS. 6A and 6B together constitute a schematic of the electrical circuit used in the practice of this invention;

FIGS. 7A and 7B together constitute a schematic similar to FIGS. 6A and 6B but showing the magnitudes and types of the electrical and solid-state components included in apparatus with which this invention is successfully practiced; and FIGS. 8 and 9 are comparison graphs based on the actual operation of the apparatus according to this invention to determine temperature of several materials.

FIGS. 7A and 7B are presented here not with any intention of any way restricting this invention but to aid those skilled in the art in the practice of this invention.

In the apparatus shown in the drawings the radiation is derived from the Object under observation which typically may be metal being processed, for example, hot-rolled aluminum strip. The radiation is projected on an Exposed Cell through a rotating Filter Disc and through the Radiation Restrictor or iris. The Filter Disc is opaque except for filters in its periphery selected to pass two wavelength bands of the spectrum of the radiation of the Object. Preferably the filters are so dimensioned that the Exposed Cell is subjected to the radiation in each band for an interval of short duration compared to the intervals between exposures.

The wavelengths bands may be in any parts of the spectrum of the radiant emitted by the body, infrared, visible, or ultra-violet but preferably should be as near each other as practicable. For a body in the temperature range between about 300° F. and about 1000° F. the bands are usually in the near infrared. For bodies at higher temperatures the bands may be in the visible. In the interest of convenience the bands will be referred to as blue and red, for the shorter and longer filter wavelengths respectively.

The apparatus includes a Cell Bridge which produces pulses as the radiation from the Object under observation in the two-wavelength bands impinge on it. The Cell Bridge includes the Exposed Cell, a Balancing Resistor, which may be another unexposed cell excited to match the Exposed Cell, an Exciting Amplifier for exciting the Balancing Resistor and Opposing Bridge Resistors R9 and R10. The Exposed Cell is maintained at a selected temperature so that it maintains its spectral response and its static resistance constant. For this purpose the cell is provided with a Heater and Cooler which respond to a temperature Sensor at the cell to maintain the temperature.

The Cell Bridge has input terminals J1 and J2 on which potential is impressed and output terminals J3 and J4 between which balance is established by the excitation of the Balancing Resistor and from which the pulses measuring temperature are derived. A feedbback amplifier consisting of an Inverting Amplifier and a Positive Amplifier (booster) is connected between J3 and J1.

The apparatus also includes a Pulse Amplifier to which the pulses are applied. The Arrow between J4 and the Pulse Amplifier shows the direction of Signal flow of the pulses.

The apparatus includes a Switching Unit and a Blue Pulse Separator and a Red Pulse Separator. The Switching Unit operates as a gate to separate the pulses produced by the radiation in the red band from the pulses produced by the radiation in the blue band. The Switching Unit operates in synchronism with the Filter Disc to transmit the pulses produced when the Exposed Cell is subjected to red radiation to the Red Pulse Separator and the pulses produced when the Exposed Cell is subjected to blue radiation to the Blue Pulse Separator.

The apparatus includes a Difference Amplifier which at its output produces a signal equal to the difference between the amplitudes of the pulses derived from the Separators. This signal is equal to the ratio of the energies in the two color pass bands; a measure of temperature. The signal from the Difference Amplifier is typically impressed on a meter M which is preferably calibrated in temperature degrees, usually Fahrenheit. In the typical practice of this invention the output of the Red Pulse Separator is maintained constant so that the Difference Amplifier may measure the output of the Blue Pulse Separator.

The potential between input terminals J1 and J2 is controlled so that, as the radiation from the body changes the amplitude of the pulse derived from the Red Pulse Separator remains constant. For this purpose the output of the Red Pulse Separator is compared to a reference potential derived from Reference I in the input of an Error Amplifier. The output of the Error Amplifier is impressed on J2 through a Negative Amplifier (Booster). The output of the Error Amplifier varies in such a sense as to reduce an error signal in its input and thus to maintain the output of the Red Pulse Separator constant. Since the responses of the Exposed Cell (changes of potential across Cell) when exposed at both bands are changed proportionately but in a manner to keep the output of the Red Pulse Separator Constant, the difference between the outputs from the Blue Pulse Separator and the Red Pulse Separator is equal to the ratio between the corresponding responses of the Exposed Cell. The ratio which is derived by the difference amplifier is the ratio of the averages of the amplitudes and not the instantaneous ratio of the amplitudes.

The apparatus also includes a Restrictor Control which controls the Radiation Restrictor causing it to limit the radiation which impinges on the Exposed Cell so that the Cell operates only over a narrow range. The input to this Control is the voltage at J2. This voltage is balanced against Reference II and controls the Motor I setting the Disc so that the radiation from the body passing to the Exposed Cell is limited. The voltage at J2 tends to increase as the intensity of radiation from the body decreases. As this voltage increases Motor I sets the disc to increase the flux impinging on the Exposed Cell.

The apparatus also includes a Calibrating Unit which includes a calibrating lamp CL with an incandescible filament. The electrical resistance of the filament is dependent on its temperature and the current supplied to the lamp is maintained at a magnitude such that its resistance is held constant. The temperature of the lamp is therefore controlled and the temperature readings of the meter M are compared to the temperature of the lamp at intervals, usually just before measurement, and the apparatus recalibrated if there is a deviation. This recalibration is effected by changing Reference I which changes the gain of the system for the whole range of energy in the blue pass band.

The radiation from the Object is limited in amount by the Radiation Restrictor which is controlled by the Motor in accordance with the signal at J2 through the Restrictor Control. The radiation from the Restrictor passes through the filters of the Filter Disc which transmits short pulses of radiation of red and blue wavelength in succession to the Exposed Cell. Electrical signals corresponding to the pulses are derived from the bridge including the Exposed Cell having terminals J1, J2, J3, J4 and amplified by the Pulse Amplifier and caused to flow in separate paths by the Red Pulse Separator and the Blue Pulse Separators. The selective operation of these Separators is controlled by the Switching Unit through the Switch Coils in synchronism with the Filter Disc. The signal from the Red Pulse Separator, through the Error Amplifier and Negative Amplifier, by feedback controls the gain of the Inverting Amplifier and Positive Amplifier so that the amplitude of the red-pulse electrical signal is constant. The blue-pulse electrical signal is read on meter M1 or used for compensation.

Figure 2:
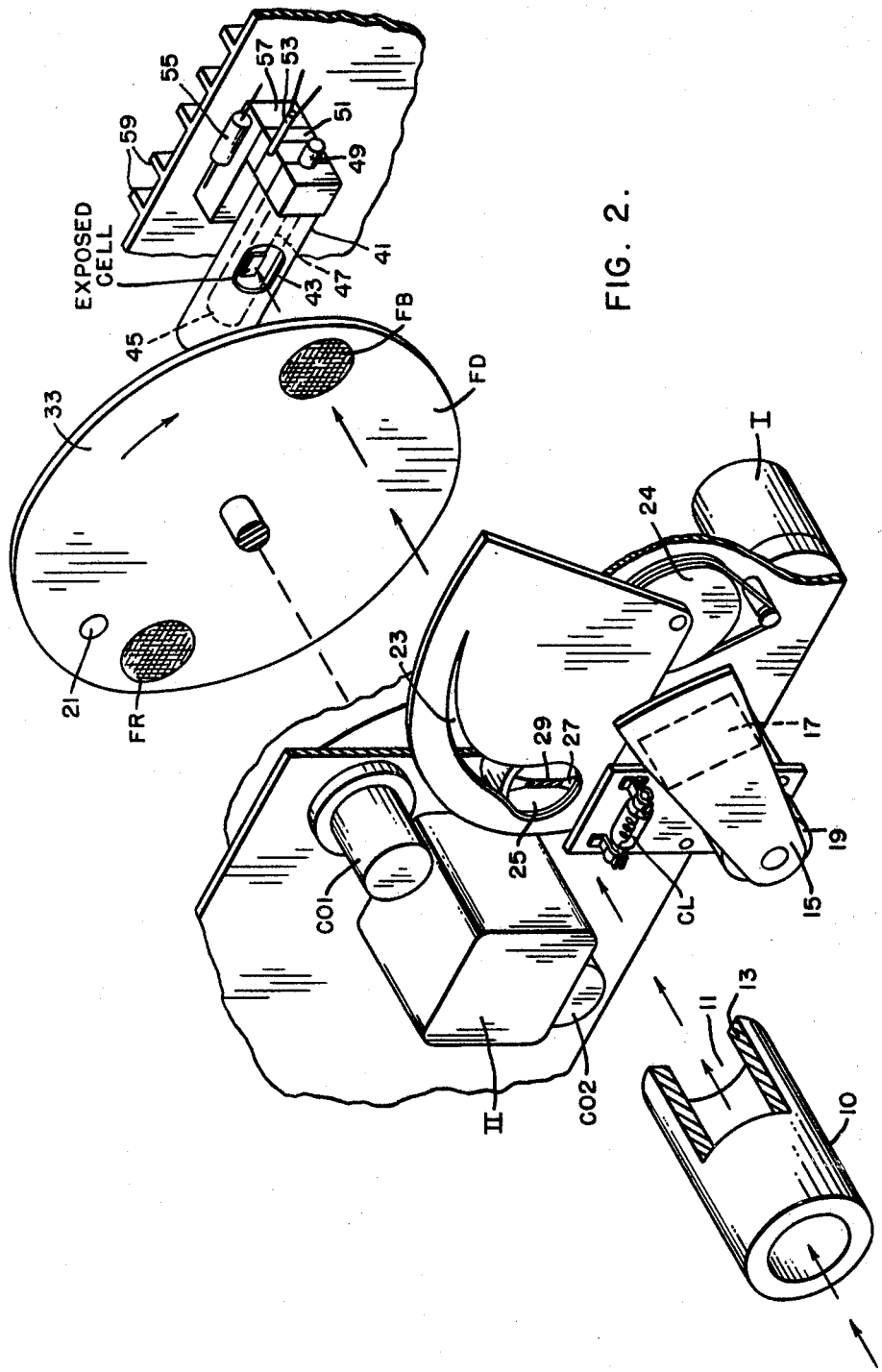
FIG. 2 is a generally diagrammatic view in isometric showing the principal mechanical components of this embodiment.

In FIG. 2 the radiation pick-up apparatus, which usually is mounted in a cabinet or box, is shown exploded. The radiation from the Object may be collimated by passing it through a tube 10 and the resulting collimated beam is passed through an opening 11 in the end ring 13 of the tube. An arm 15 carrying a mirror 17 is mounted pivotally on the armature of a solenoid 19 in a position where it blocks the opening 11, but the arm is biased to the retracted position where opening 11 transmits radiation from the Object. The calibrating lamp CL is disposed adjacent the Ring 13 in a position such that when the arm 15 is in the blocking position the radiation from the lamp CL replaces the radiation from the Object. The apparatus may then be calibrated or checked for calibration by replacing the radiation from the object with the light from lamp CL reflected by mirror 17.

The Radiation Restrictor is a disc having a slot 23 through which the radiation from aperture 11 passes with the arm 15 retracted or the radiation from CL passes with the arm 15 in calibrating setting. The disc is set by Motor I through a slip-drive pulley 24 so that the slot 23 limits the radiation which it transmits. The slot 23 is of a generally circular form; its radiation-permeable area varies geometrically per unit angle from one end to the other. The radiation passing through slot 23 is focused by lens 25 on the Exposed Cell.

Figure 3:
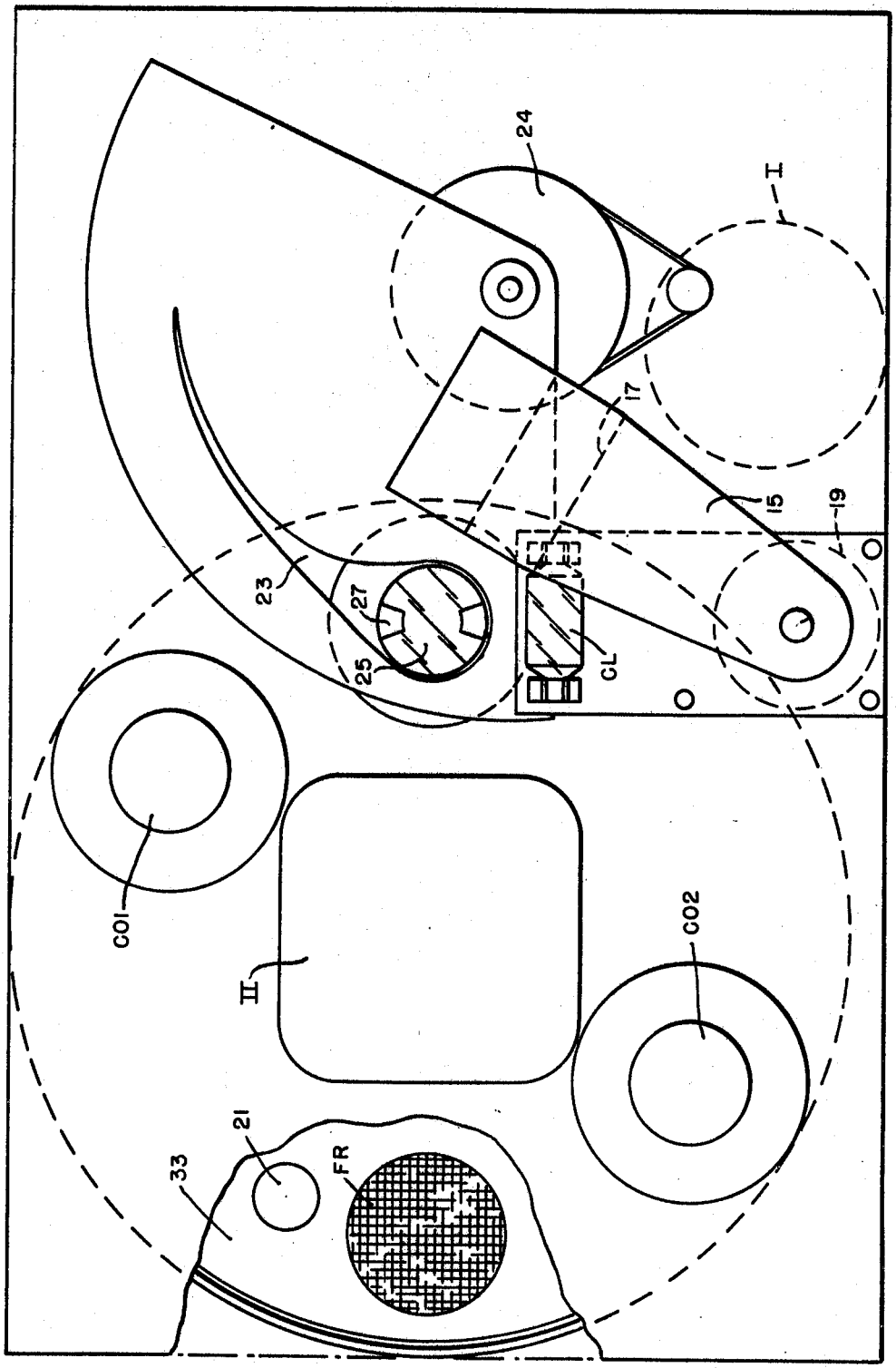
FIG. 3 is a view in front elevation of the components shown in FIG. 2.

The lens 25 is covered by a narrow opaque strip 27 which terminates near the center in a screen 29 (FIG. 5). The strip 27 assures that when the radiation from the Object is of high intensity and the slot 23 is set to transmit in the narrow position the radiation impinges in the center of the lens 25 through the screen 29 and not along its outer periphery as at 31 (FIG. 4) where aberration would occur. This highly improves the precision. Because the region 27 is opaque the slot 23 positions itself so as to transmit radiation through the screen 29 and the center of the lens. In the absence of the opaque strip 27 (FIG. 3) the disc would position itself to transmit radiation to the outer edge of the lens. The purpose of the screen 29 is to extend the range of the slot 23.

The Filter Disc FD (FIG. 2) is interposed between the lens 25 and the Exposed Cell and includes the filters FR, for the red radiation, and FB, for the blue radiation, and is rotated by Motor II so that the filters FR and FB alternaately intercept the radiation flowing through opening 11.

Figure 1:
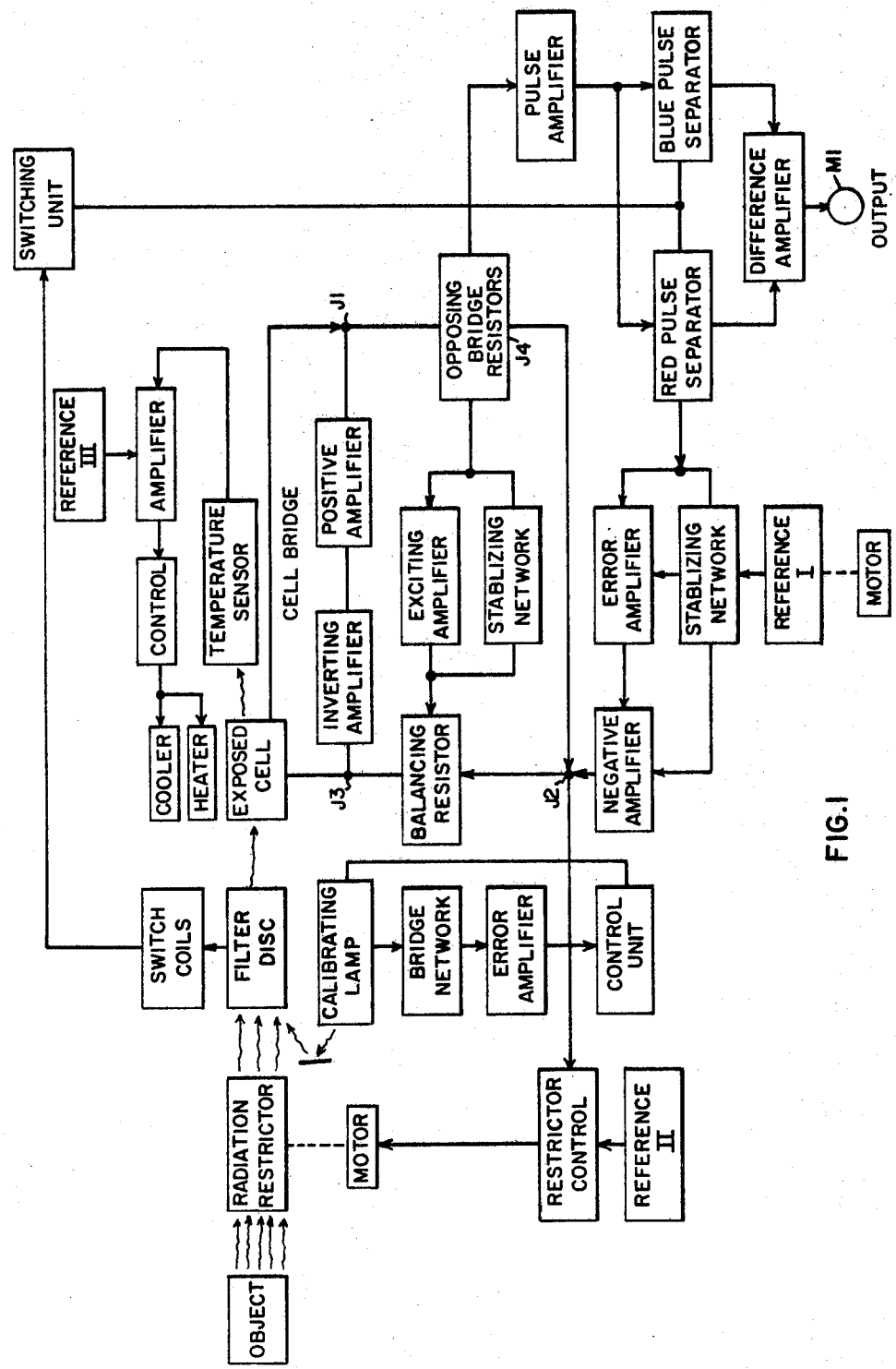
FIGURE 1 is a block diagram showing the principal components of this embodiment and their electrical relationship.

Typically the Filter Disc may be rotated at the rate of about 3000 revolutions per minute. The Disc is synchronized with the Switching Unit (FIG. 1) by the cooperation of a small magnet 21 on the Disc and a pair of coils CO1 and CO2 displaced around the periphery of the Disc in the path of the field of this magnet 21. The magnet 21 produces a pulse in each coil and this pulse causes the Switching Unit to switch from one gating condition to the other. The Switching Unit is switched to open the gate to the red pulse and close the gate to the blue by the coil CO1, just before the red filter FR intercepts the radiation, and to open the gate to the blue and close the gate to the red, just before filter FB intercepts the radiation.

The Exposed Cell is in a housing 41, the interior of which is non-reflective and the lens 25 focuses the radiation on the Exposed Cell through a small opening 43 in this housing. The Cell is mounted in an evacuated quartz tube 45 on a conducting stud 47 which is brought out through a Kovar alloy vacuum sealing member 49. The member 49 is clamped, in heat interchange relationship, to a block 51. The block has mounted therein a Temperature Sensor 53, a Heater 55 and a Cooler 57 all in heat-interchange relationship with the cell. To achieve more effective cooling the block is provided with fins 59 which may be water cooled.

The face 33 of the Filter Disc facing the Cell may be highly reflective. This assures that the Exposed Cell is not affected between pulses by radiation dependent on ambient temperature.

The apparatus according to this invention is shown in detail in FIGS. 6A and 6B. It is desirable to discuss these figures generally at the outset.

The apparatus shown in FIGS. 6A, 6B includes amplifiers A1, A2, A3, A4, A5 which are standard products, sold under the name, high-gain operational amplifier. These amplifiers A1 through A5 have a pair of inputs, at the bases of the representing triangles and an output at the apex. By convention a signal impressed at the upper input terminal produces a signal of opposite polarity at the output and a signal impressed at the lower input terminal produces a signal of the same polarity at the output. The upper terminal is sometimes referred to as "negative" and the lower terminal as "positive." The polarity of the output may be set by selection of one or the other inputs.

In the use of these amplifiers A1 through A5 in the practice of this invention each amplifier is provided with a balancing network, for example, A1 includes resistors R4 and R5, A2, R14 and R15, and the other like networks. Each amplifier A1 through A5 includes opposite polarity power supply facilities usually +12 volts and −12 volts referred to an intermediate common ground. The amplifier A1 which does not have direct feedback connections from its output to its input includes a clamping network, resistor R6 and diode CR1, to prevent positive feedback if the amplifier A1 is overdriven during a transient.

In addition to amplifiers A1 through A5, the apparatus includes amplifiers NA and PA and Q1 through Q20. These other amplifiers are of the solid state type and are shown in detail in FIGS. 6A, 6B with component magnitudes in FIGS. 7A, 7B. These other amplifiers also include Regulating components, like Zener diodes, CR2 and CR3 on the positive amplifier PA, and CR25 on the negative amplifier NA. These also include protective diodes, for example, CR4 on Q1 and CR26 on Q3. In the interest of avoiding excess verbiage such components will not be again mentioned in the detailed discussion which follows.

With reference to FIGS. 6A, 6B the Cell Bridge includes in its arms the Exposed Cell (FIG. 6A), which is a photo-conductive element, the Compensating Impedance, which specifically is a photo-conductive resistor or element R2, the resistor R9 and the resistor R10 (FIG. 6B). R2 is shunted by R3 which sets the maximum resistance in the compensating leg and R1 to set the minimum. The Bridge has conjugate input terminals J1, between R9 and the Exposed Cell, and J2 between the Compensating Impedance R2 and R10. The Bridge has conjugate output terminals J3 and J4 at the other junctions.

Terminal J3 is connected to the negative input of A1; the other input is grounded, the output of J1 is connected to the input of PA. The positive amplifier PA includes the transistor Q1, the base of which is grounded through resistor R11 and the emitter connected to the output of A1 through R7. The transistor Q1 is supplied with potential through resistor R8. The collector is connected to J1 and thus constitutes the positive pole of the potential between J1 and J2. There is feedback from J1 through the Exposed Cell to J3. The feedback is such that current of the same magnitude which flows from J2 to J3 flows through the Exposed Cell regardless of the resistance of the Exposed Cell. The voltage at J1 is then proportional to the resistance of cell and the voltage at J2. Capacitors C3 and C2 between J1 and J3 and J3 and J2 provide AC balance of the network and C3 limits the upper frequency response of A1.

The potential at J2 is determined by the negative amplifier NA. This amplifier NA is connected as a booster to the Error Amplifier A4 which maintains the pulse from the Red-Pulse Separator constant. The amplifier NA includes transistor Q3 also having a grounded base through R51. The emitter of Q3 is supplied from the output of A4 through R52. The collector is connected to J2 through CR24, which prevents the polarity at the collector from reversing. The capacitor C34 between the collector of Q3 and the reference input of A4 produces frequency stabilization. The connection from the collector of Q3 to J2 is a feedback connection through the Compensating Impedance since A1 is in the amplifier chain A1, PA, A2, A4, NA.

NA sets the input voltage to the Cell network (at J2) so that the pulse at the Red Pulse Separator remains constant. The feedback through PA and the Exposed Cell is set so that J3 remains at ground potential regardless of the changes in the conductivity of the Exposed Cell.

Automatic static balance of the bridge is effected by a network including the photo-conductive element R2 which is similar to the Exposed Cell, an amplifier A5 and a lamp LA with an incandescible filament. The element R2 is connected across the resistor R3 and responsive to the lamp LA sets the resistance of the arm of the Cell bridge including resistor R3 and R2 so that the Cell bridge is balanced statically. Depending on the output of LA the element R2 may vary between 10,000 ohms and 10 megohms.

J4 is connected to the negative input of A5 through resistors R12 and R48 (shunted by capacitor C33). The output of A5 is connected to the base of a transistor Q2 through a resistor R44. The emitter circuit of Q2 is connected to energize LA to which element R2 is exposed. A static or slowly changing unbalance at J4 (deviation from ground), which would be predominately caused by slow change in the resistance of the Exposed Cell, changes the resistance of element R2 so as to produce a balance. The influence of rapid changes is suppressed by the capacitors C28, C29, C30, C31, C32 which with A5 forms an integrator.

With the Cell Bridge balanced the signals produced by the radiation through the filters FB and FR is transmitted through the output terminal J4. But the slow changes across the terminals J1 and J2 are highly attenuated and suppressed.

The Pulse Amplifier includes the amplifier A2. The dynamic output of the Cell bridge at J4 is impressed on the lower terminal of A2 through the differentiating network including capacitors C4 and resistor R13. The feedback through feedback network FB1, including resistances R16 and R17 and shunting capacitor C7 and capacitor C5 and C6 to ground, sets the DC gain at about 1 and the AC gain at about 300.

The Blue Pulse Separator and the Red Pulse Separator each includes an input network including R19 and C8 in series and R22 and C9 in series, respectively. CR5 between R19 and ground and CR10 between R22 and ground are clamping diodes suppressing positive signals from the inputs of the Blue Pulse Separator and the Red Pulse Separator. CR6 is a clamping diode connected to R19 to prevent the blue pulse from entering the Red Pulse Separator and CR11 is a clamping diode preventing the red pulse from entering the Blue Pulse Separator. These networks are connected in common to the output of A2. C8 is connected to one output of the Switching Unit through a diode CR7, and C9 is connected to the other output of the Switching Unit through diode CR12. The diodes CR7 and CR12 are so poled that when the connected output of the Switching Unit is in gating condition, the capacitor C8 or C9 is charged through the diode CR7 or CR12, and when this output is in blocking condition, the capacitor C8 or C9 is blocked from charging but is capable of discharging through CR8, and R23 and, through CR13 respectively.

Diode CR9 and resistors R20 and R21 clamp the Blue Separator Tank from operating when the radiation is so small as to preclude the proper operation of the regulating feedback loop A1, PA, A2, A4, NA. The clamping occurs when J2 is at a predetermined potential for which the regulating action would be absent. Typically J2 may be at 26 volts relative to ground at no input radiation and the clamping effect of CR9 is removed with J2 at 18 volts.

The capacitor C8 is connected to the output of the Blue Pulse Separator through CR8. The cathode of diode CR8 is connected to the negative input of amplifier A3 and to the feedback network FB2. At this point substantially the whole output of CR8 flows through R31 in the feedback network FB2.

The output of the Blue Pulse Separator (through R31) which is proportional to the temperature is read on meter M1 (FIG. 6A). The correlation of the lowest meter reading and actual lowest temperature is established by bias applied to the positive input terminal of A3 through resistors R25 and R26. R25 is so set that when the output of A3 is zero, the meter deflection is zero. The bias may also be obtained from the Red Pulse Separator; under certain conditions this may improve transient accuracy.

The feedback network FB2 is connected between the negative input terminal and the arm of a variable resistor R29 connected between the output of A3 and ground through resistor R30. As the pulses from the Blue Pulse Separator are impressed on the negative input of A3 feedback potential is produced through the network FB2 tending to maintain the potential at the negative input unchanged. The network FB2 operates to integrate the pulses so that the output is a steady potential proportional to amplitude of pulses from Blue Pulse Separator. This potential is measured on meter M1 (FIG. 6A) which is connected to the output through resistor R32. Resistor R29 serves to adjust the range of the apparatus.

Across the resistor R32 a linearizing network LIN (FIG. 6A) is connected. This network includes rectifiers CR23, CR58, CR59, CR60, CR61, CR62. A resistor bank R123, R124, R125, R126, R127 is connected between rectifiers CR58 and CR59, CR60, CR61 and CR62. Each rectifier has a forward drop of about ½ volt. As the output potential of the blue-pulse network increases, the rectifiers CR59 through CR62 successively shunt in resistors R123 through R127 at ½ volt intervals thus suppressing non-linearity in the response of M1. The Switching Unit alternately applies a negative potential and ground to the anodes of CR7 and CR12 (FIG. 6B). While ground is applied C8 is charged so long as the blue pulse is applied to the input of the Blue Pulse Separator. When the blue pulse is terminated, C8 discharges through CR8.

The output of A3 is determined by the current through R31 and sets the potential across all of R29 and R30. The setting of R29 sets the output of the amplifier A3. The output of A3 supplies the meter M1 through R32. The capacitors C12 and C13 smooth the current through resistor R31.

The capacitor C9 is connected through resistor R23 and diode CR13 poled similarly to CR8 to charge the network of capacitors C10, C11 and resistor R24 when the red pulse disappears after the capacitor has been previously charged by the red pulse. The potential of this network C10–C11–R24 provides a measure of the amplitude of the pulse proportional to the radiation in the red band. This potential is compared with Reference I which is derived from divider R57 and R56 and is trimmed by motor-driven variable resistor R59, the arm of which is in series with R58. Diode CR28 provides a standby charge on capacitors C10 and C11 to improve response.

The Switching Unit is a bistable flip-flop including transistors Q4 and Q5. The emitters of these transistors are grounded. The collectors are connected to the negative pole of a supply through resistors R60 and R61 respectively and the bases are connected to positive bias through R64 and R65 respectively. The collector of transistor Q4 is cross-connected to the base of Q5 through R63 and the remaining collector and base are likewise connected through R62. Energizing pulses are impressed between the base and emitter of each transistor through CO1 and CO2 respectively when the magnet 21 passes the respective coils.

Normally one transistor, Q4 or Q5, conducts while the other is non-conducting. Assume Q4 conducts. The anode of CR12 is then grounded permitting C9 to be charged by the red pulse, while blocking potential is impressed on CR7. The anode of CR6 is also grounded preventing the red pulse from affecting the discharge of C8. When the magnet passes CO2, Q5 becomes conducting blocking Q4. C8 is then charged. The charging in each case takes place while the corresponding filter intercepts the radiation and is proportional to the intercepted radiation. The discharge pulse in each case has a magnitude proportional to the intercepted radiation.

The Error Amplifier includes the amplifier A4 and the Negative Amplifier NA, which serves as a booster for A4. Reference I is connected to the negative input of A4 and the integrating network C10, C11, R24, to the positive input. A4 has an output dependent in magnitude and polarity on the difference between the integrating-network output and Reference I.

The amplifier NA includes the transistor Q3. The base Q3 is grounded, through resistor R51. The output of A4 is connected to the emitter of Q3 through resistor R52. The collector of Q3 is connected to J2 through diode CR24. The output from this collector is negative. Diode CR24 prevents any positive potential which appears, during transients, in the collector of Q3 from appearing on J2.

The amplifiers A1 and PA impress on J1 the electrical mirror image (equal and opposite) of the potential on J2. The potential on J2 determines the current through the Exposed Cell.

The supply potential of PA is greater than that of NA (62 volts as compared to 56 volts see FIGS. 6A–6B) so that A1–PA can adequately operate over the entire range of swing at J2. To prevent A1–PA from being overdriven to a positive feedback condition when power is first applied, the power supply has a delay (of about .1 to .2 second by RC constants of power supply) between the impressing of lower voltage on NA and the impressing of the higher voltage on PA.

The Restrictor Control (FIG. 6A) includes Motor I which has two center-tapped field windings F1 and F2 with armatures mounted so that energization of F1 causes Motor I to rotate in a direction to increase the radiation to the Filter Disc (iris opens) and energization of F2 causes Motor I to rotate in a direction to decrease the radiation to the Filter Disc (iris closes).

The windings F1 and F2 are supplied with power from a secondary section of transformer T1 through silicon controlled rectifiers Q15 and Q16. When Q15 is conducting and terminal A is positive, current flows as follows through F1: A, CR46, half F1, Q15, ground. When terminal C is positive, current flows as follows: C, CR47, other half F1, Q15, ground. Current flows analogously when Q16 is conducting.

Q15 and Q16 are controlled from the output of the negative amplifier NA (FIG. 6B) through a two-stage balanced input-and-output amplifier SCRA including the transistors Q10, Q11, Q12, Q13. The output of NA connected to Q10 is isolated from the output connected to the Cell Bridge, by rectifier CR27 and resistor R49 (FIG. 6B), so that the output of NA is not affected by the Restrictor control. Reference II (FIG. 6A) is provided in SCRA for comparison. Reference II includes resistors R84 and R85 forming a voltage divider between a negative potential and ground. The junction between R84 and R85 is connected to the base of Q11. For comparison, the potential at J2 is impressed in the base of Q10 through resistor R76.

The input at Q10 is compared with Reference II at Q11. Q12 and Q13 are simply cascade with Q10 and Q11 respectively. When the potential at J2 is equal to Reference II, Q10 and Q11 are balanced and the bases of Q15 and Q16 are negative with respect to the emitters. Motor I is at rest. With J2 positive with respect to the reference the base of Q16 becomes positive with respect to the emitter and Motor I is operated to reduce the radiation on the Exposed Cell to reduce the unbalance between J2 and Reference II approximately to zero. When J2 is electrically negative relative to Reference II, the base of Q15 becomes positive relative to the emitter and the radiation in the Exposed Cell is correspondingly increased to reduce the difference between J2 and Reference II approximately to zero.

The gain of the amplifier SCRA is set by negative feedback resistor R82 which operates in conjunction with R76.

The Restrictor Control also includes facilities for suppressing unnecessary or undesirable excursion during the intervals of a repetitive operation when the radiation is interrupted entirely. For example, the apparatus may be used to measure the temperature of strip which is passing through a mill intermittently. It is desirable to avoid unnecessary excursion of the Control between strips because this would delay the temperature measurement.

The unnecessary excursion is suppressed by operation of transistor Q14. The collector of this transistor Q14 is connected to the collector of Q13 through diode CR39. The base of Q14 may be connected by a selector switch S4 to a negative voltage which prevents action of the suppressing circuit by rendering Q14 nonconducting or to the output of A3 through R91. The emitter of Q14 is connected to ground.

When S4 is in the locked setting and the radiation on the Exposed Cell suddenly corresponds to a temperature below the lowest-scale reading of the meter M1, as may happen between strips, Q14 conducts preventing conducting of Q15 and movement of the Disc. In the locked setting the Disc is free to move for temperature excursions on the scale of M1.

The Calibrating Unit includes a transformer T2. The secondary T2S of T2 supplies the input, or power, terminals of a bridge network including the calibrate lamp CL and Resistors R97, R98, R99, R100 and R122. The primary T2P of T2 is supplied from the secondary T1S of T1 through silicon-controlled rectifier Q20 and R114. The main circuit of Q20 is adapted to be connected between ground and an end terminal of T2P through the contact S1a of a switch S1 which turns on the calibrate operation. The contact S1a of this switch connects the solenoid 19 to be energized so that the arm 15 (FIG. 2) is swung to the calibrating position. The other end terminal of T2P is connected to the collector of Q20 through diode CR55 shunted by resistor R113. Q20 collector is shunted to ground by R112. Current through T2P is conducted through Q20 and R114 in parallel and its magnitude depends on the conductivity of Q20. The bulk of the power to CL is supplied through R114; the regulating power is supplied through Q20. Q20 is controlled from the bridge including CL so as to maintain the resistance, and thus the temperature of CL constant.

The bridge delivers alternating-current pulses at its output terminals which depend in amplitude on the deviation of the temperature of CL from a preset magnitude for which the bridge is balanced. The amplifier including transistors Q17 and Q18 amplifies the voltage. Q19 senses the phase of these alternating-current pulses and their magnitude and controls the firing angle of Q20 during alternate half periods. During the intervening half periods the current is carried by R114. The regulation only during half periods permits the bridge to recover from the transients produced by the sudden firing of Q20.

During calibration the Restrictor Disc is set at its maximum transmission opening by the supply including C35 which is charged through S1b and the voltage doubler CR42–CR43. The negative terminal of this supply is connected to the base of Q16 and the positive terminal to the base of Q15. Q15 is then fully conducting and Q16 blocked so that the Disc is set to transmit the maximum radiation.

To maintain the Exposed Cell at constant temperature the Heater and Cooler are controlled in dependence upon the response of the Temperature Sensor which is a temperature-responsive resistor R66. R66 and a fixed resistor R67 form a divider to establish a signal potential which is compared to Reference III developed by divider R72–R74. The signal potential and Reference III are applied to the bases of transistors Q6 and Q7 of a differential amplifier. Q6 and Q7 respectively control silicon-controlled rectifiers Q8 and Q9, which in turn control relays K2 and K1.

When the temperature of the block 51 (FIG. 2) is below the temperature set by Reference III (by as little as ⅓° F.), the conductivity of Q6 decreases and the base of Q8 becomes positive actuating K2 to turn on the Heater. The Heater is turned off when the difference is less than ⅓° F. Likewise, through Q7 and Q9 K1 will turn on the cooler if the temperature of block 51 is higher than that of Reference III by ⅓° F.

The mass of the block 51 in conjunction with close proximity of R66 both with the Heater and the Cooler suppress hunting over an external ambient temperature span of 32° F. to 120° F.

In the use of this apparatus the apparatus is first calibrated by operating switch S1 and subjecting the Exposed Cell to radiation from CL. The reading of M1 is compared with the proper reading for the known temperature of CL and resistor R59 is set so that M1 reads this known temperature. Switch S1 is opened and Exposed Cell is subject to the radiation from the Body. An accurate reliable determination of temperature is thus achieved.

FIGS. 8 and 9 are graphs illustrating an important aspect of this invention. In each of these graphs actual temperature measurements with apparatus according to this invention are plotted vertically as a function of actual comparative thermocouple temperature measurements, plotted horizontally. The data for these graphs was derived by measuring the temperature of four specimens as follows:

(A) No. 2024 aluminum wire brushed before test run to remove oxide
(B) No. 2024 aluminum (light tan oxide) as rolled
(C) No. 1100 aluminum (mirror bright) as rolled
(D) No. 5083 aluminum (high magnesium-dark tan oxide) as rolled Each specimen was one foot square; A was ½ inch thick and B, C, D, 1 inch thick. The thermocouple was embedded in a hole parallel to the radiation surface and ¹⁄₃₂ inch below this surface extending about 6″ from the entering edge to prevent heat loss from the hot junction. The thermocouple was wedged in the hole.

The data for FIG. 8 was taken with filters having center wavelengths of 2.56 microns and 2.17 microns respectively; the data for FIG. 9 with filters having center wavelengths of 2.3 microns and 1.85 microns. The center wavelength difference for FIG. 8 is .39 micron and for FIG. 9 it is .45 micron. The data for FIG. 8 shows a substantially higher precision, ±15° F. deviation at the maximum point than FIG. 9, ± 25° F. deviation.

FIGS. 8 and 9 show that it is desirable that there be a relatively small center wavelength difference between the red and blue bands. But this difference must exist and must be finite. It appears that there is a small center wavelength difference at which optimum precision is achieved and that the precision worsens as the difference is increased or decreased from this optimum wavelength difference. The wavelength difference for which FIG. 8 was derived approaches this optimum. The reduction of the difference between the wavelength characterizing the two bands (for example center wavelengths) predominately reduces the errors in temperature measurements which might arise from differences in the emissivity of different bodies at different temperatures and/or wavelengths, or at the same temperature and/or wavelength and also suppresses such effects as resonate in the emission spectrum of a body.

While preferred embodiments of this invention have been disclosed herein, modifications thereof are feasible. This invention is not to be restricted except insofar as is necessitated by the spirit of the prior art.

I claim as my invention:

1. Apparatus for determining the temperature of a body comprising a bridge network in which is connected in series radiation-responsive means (Cell), compensating means (R2), and impedance means (R9, R10) having an intermediate tap (J4), said responsive means and said compensating means having a common junction (J3) defining an output terminal of said network and said tap (J4) defining the conjugate output terminal of said network, the junctions (J1, J2) of said responsive means and said compensating means and of said impedance means defining the conjugate input terminals of said network, means for subjecting said responsive means to the radiation from said body, amplifier means (A1) having an input-circuit means and output-circuit means, means connecting said common junction (J3) in input relationship with said input circuit means, means connecting said output-circuit means (including Q1) to supply said conjugate input terminals (J1) of said network, said tap being set so that said network is balanced, feedback means between said input terminals (J1) and said responsive means, the feedback supplied by said feedback means to said common junction being set so that said common junction (J3) is maintained at a constant potential as the temperature of said body varies, and means connected to said tap responsive to potential changes of said tap to indicate the temperature of said body.

2. Apparatus for determining the temperature of a body comprising filter means for deriving from said body first optical radiation in a first wavelength band (FR, FIG. 2) and second optical radiation in a second wavelength band (FB), compensating conductive means (R2, R9, R10), photo-conductive means (Cell, FIG. 6A), means for subjecting said photo-conductive means to said first and second radiation in succession (Disc FD), means connecting said compensating conductive means and said photo-conductive means in a signal producing circuit in which they have a common junction (J3) and which circuit includes an output terminal (J4) between which and the common junction an output signal dependent on said radiation is produced, said compensating conductor means and said photo-conductive means having generally the same properties so that said conductive means compensates for changes in the photo-conductive means resulting from causes other than the first and second radiation, amplifier means (A1) having an input circuit and an output circuit, means connecting said junction to said input circuit, means (A2, Red Pulse Separator, A4) connecting said signal producing circuit in a first feedback loop, said feedback loop impressing a driving potential in said signal producing circuit to maintain the output at said output terminal resulting only from said first radiation (FR) constant independently of the intensity of said first radiation, means (Q1) connecting said amplifier means in a second feedback loop including said photo-conductive means (Cell), said second feedback loop being set to maintain the current through said photo-conductive means constant for different conductivities of said photo-conductive means at any driving potential impressed in said signal producing circuit by said first loop.

3. The apparatus of claim 2 wherein the photo-conductive means is subject to the first and second radiations for short time intervals compared to the intervening intervals.

4. The method of determining the temperature of a body by successively sampling the radiation from said body in a first wavelength band and in a second wavelength band, with apparatus including photo-conductive means subjected in succession to said radiation in said first and second bands and conductive means, said photo-conductive means and said conductive means being connected in series to the input of an amplifier having an output, the said method comprising, responsive to the input to said amplifier, and in dependence on the response of said photo-conductive means to radiation in said first band, maintaining the voltage across said conductive means and said photo-conductive means in series such that the output of said amplifier is the same for the radiation in said first band regardless of the conductivity of said photo-conductive means, responsive to the input to said amplifier, and in dependence on the response of said photo-conductive means to the radiation in said second band, setting the current through said photo-conductive means so that, regardless of the conductivity of said photo-conductive means, said current is constant at any magnitude of said voltage across said conductive means and said photo-conductive means in series but changes for different magnitudes of said voltages in dependence on said magnitude, and determining the output of said amplifier.

5. Apparatus for determining the temperature of a body radiating heat comprising first radiation responsive means (R2), second-radiation responsive means (Cell), means for subjecting said second means to radiation from said body, means connecting said first and second means to have a common electrical junction (J3), first potential-supply means (potential impressed at J2) connected to said first radiation-responsive means for impressing a first difference of potential on one of said radiation-responsive means so that said junction is at a first potential having a predetermined magnitude, said difference of potential being dependent on the radiation impinging on said second radiation-responsive means, second potential-supply means (potential impressed from J1) connected to said other radiation responsive means (Cell) for impressing a second difference of potential on said other radiation-responsive means in dependence upon said radiation impinging on said second means, so as to tend to change the magnitude of the potential at said junction (J3), means (Q1) connected to said second potential-supply means for regulating said second potential difference so as to maintain said potential at said junction (J3) at said predetermined magnitude, and means (A2, Blue Pulse Separator, A3) connected to said second potential-supply means, responsive to the change in said second potential difference, to determine said temperature.

6. Apparatus for determining the temperature of a body which emits optical radiation dependent on its temperature, comprising a photo-conductive element (Cell), an impedance element (R2), means connecting said elements in a radiation responsive circuit, filter means for subjecting said photo-conductive element to the optical radiation from said body, amplifier means (A2) having input terminals and output terminals, means connecting said circuit including said elements to said input terminal to impress thereon a signal dependent on said radiation, means (A4, NA) connecting said output terminals in a a feedback loop in current-supply relationship with said elements in said circuit, the magnitude of the current supplied depending on the voltage impressed in said loop, additional amplifier means (A1), means connecting one of said elements and said additional amplifier means in a second feedback loop (through A1) set to maintain the current through said elements constant for different conductivities of said photo-conductive element at any said voltage of said first-mentioned loop, and signal indicating means connected to said output terminals.

7. Apparatus for determining the temperature of a body emitting optical radiation characteristic of said temperature comprising, first and second means connected in a network in balancing relationship, at least the first of said means (Cell) being optical- and radiation-responsive, filter means for producing in succession a first radiation pulse of a first magnitude (FR) in a first wavelength band of said emitted radiation and a second radiation pulse (FB) of a second magnitude in a second wavelength band of said emitted radiation, each said first and second pulse being of short duration compared to the duration of the interval between pulses, means for impressing said first and second pulses in succession on said radiation-responsive means (Cell), a first amplifier (A4, NA) having a first output terminal (J2) and a first input terminal, a second amplifier (A1, PA) having a second output terminal (J1) and a second input terminal, means connecting an electrical point on said first of said means to said second output terminal (J1), means connecting a second electrical point on said first of said means to said second input terminal (at J3) so that said first means is in feedback relationship with said second amplifier, said second output terminal delivering a potential of a first algebraic magnitude at said second output terminal, first output means (A2, Red Pulse Separator) connected to said network for delivering a first output in dependence upon the response of said first means (Cell) to radiation in said first band, second output means (A2, Blue Pulse Separator) connected to said network for delivering a second output in dependence upon the response of said first means to radiation in said second band, said first and second output means each responding only to the electrical variations in said network and said first and second outputs being dependent substantially only on the respective amplitudes of said first and second pulses, means connected to said first output means for impressing said first output on said first input terminal, means connecting said first output terminal to an electrical point (J2) on said second of said means connected in said network in balancing relationship, means connecting another electrical point on said second of said means to the second electrical point of said first of said means to form a common junction between said other points (J3), said first output terminal delivering a potential of a second algebraic magnitude to said electrical point (J2) on said second means, the difference of the potentials of said first and second algebraic magnitudes being impressed across said first and second means connected in balancing relationship, the feedback of said second amplifier across said radiation-responsive means being set so that said junction is at a substantially constant electrical potential, and means connected to said second output means for determining said second output to determine said temperature.

8. Apparatus for producing signals dependent on the optical radiation emitted from a body for a plural wavelength pyrometer comprising means responsive to said body for producing in succession a first pulse in a first optical wavelength band of said emitted radiation and a second pulse in a second optical wavelength band of said emitted radiation, a first filter channel connected to said producing means for transmitting said first pulse, a second filter channel connected to said producing means for transmitting said second pulse, a flip-flop having a first terminal and a second terminal, means connecting said first terminal in gating relationship with said first channel, means connecting said second terminal in gating relationship with said second channel, each terminal having a first condition in which it blocks its corresponding channel and a second condition in which it permits its corresponding channel to transmit a said pulse, one of said terminals being at any time in a first condition and said other terminal being simultaneously at said time in a second condition, and means connecting said producing means in synchronizing relationship with said flip-flop to set successively said first terminal in said first condition and said second terminal in said second condition during the producing of said first pulse and said second terminal in said first condition and said first terminal in said second condition during the producing of said second pulse.

9. Apparatus for producing signals dependent on the radiation emitted by a body for a plural wavelength pyrometer comprising a disc having in the surface thereof in spaced positions a filter, when said radiation impinges thereon, capable of emitting resulting radiation in only a first wavelength band of said emitted radiation and a second filter, when said radiation impinged thereon, capable of emitting resulting radiation in only a second wavelength band of said emitted radiation, a magnetic element on said disc displaced from said first filter, means connected to said disc for rotating said disc with said emitted radiation impinging successively on said filters and said filters emitting successively radiation in said first and second wavelength bands, means responsive to the radiation successively emitted by said filters for transmitting first and second signals corresponding respectively to the resulting emitted radiation in said first and second wavelength bands, a flip-flop having a first condition and a second condition, means connecting said flip-flop in gating relationship with said transmitting means so that said flip-flop blocks the flow of said first-wavelength radiation and permits the flow of said second wavelength radiation in said first condition and blocks the flow of said second wavelength radiation and permits the flow of said first wavelength radiation in said second condition, said flip-flop including a first input coil and a second input coil, said first coil being positioned to receive a pulse from said magnetic element to flop said flip-flop from said first condition to said second condition prior to the resulting emission from said first filter of said first wavelength radiation and said second coil being positioned to receive a pulse from said magnetic element to flop said flip-flop from said second condition to said first condition prior to the resulting omission from said second filter of said second wavelength radiation.

10. A plural wavelength pyrometer for determining the temperature of a body by measuring the intensity of its optical radiation in a plurality of wavelength bands, including photo-sensitive means disposed to receive the radiation from said body, a shield opaque to the radiation from said body but having filters therein each capable of passing the radiation in a different one of said bands interposed between said body and said photo-sensitive means, and means connected to said shield for moving said shield so that radiation in said bands impinges successively on said photo-sensitive means at intervals, said photo-sensitive means being subject to radiation emitted from the opaque portion of said shield in the intervals intervening between the impingement of said radiation on said photo-sensitive means, said opaque portion of said shield being highly reflective to radiation.

11. A pyrometer for determining the temperature of a body which emits optical radiation including photosensitive means, a lens interposed between said photo-sensitive means, and said body for projecting the radiation from said body on said photo-sensitive means, a plate having an opening, permeable to said radiation, which moves from a very small area per unit length in one region to a substantial area per unit length in another region, said plate being interposed between said body and lens and being selectively set with any part of said opening in radiation transmitting relationship with said lens, and a mask in said lens restricting the radiation received by said lens to the central region of said lens when said plate is set so that said very small area is in radiation transmitting relationship with said lens.

12. A calibration source for a pyrometer including a lamp having an incandescible filament, the resistance of said filament varying with the temperature thereof, controllable electric valve means, power supply means connected in circuit with said electric valve means and said filament for supplying heating current to said filament, and means responsive to the resistance of said filament for controlling said valve means to maintain the heating current such that the temperature of said filament is constant.

13. Apparatus for determining the temperature of a body comprising a bridge network having a plurality of arms defining conjugate input and output terminals, photo-conductive means subject to said radiation in one of said arms, conductive means in an adjacent arm, said conductive means and photo-conductive means having a first junction which constitutes one of said output terminals, first impedance means and second impedance means in said other arms of said bridge, said impedance means having a second junction constituting said other conjugate output terminal, and first and second impedance means each having a third and a fourth junction respectively with said photo-conductive means and said conductive means respectively, said last-named junctions constituting said conjugate input terminals, amplifier means having input and output, means connecting said first junction to said input, means connecting said output to said conjugate input terminals, the feedback from said output of said amplifier means to said first junction through said network being set so that the potential of said last-named junction remains substantially constant, means connected to said junction of said first and second impedance means and responsive to an unbalance of said network to balance said network, and means responsive to potential changes connected to said junction of said first and second impedances to indicate said temperature.

14. Apparatus for determining the temperature of a body emitting optical radiation characteristic of said temperature comprising a bridge network having a plurality of arms defining conjugate input and output terminals, photo-conductive means subject to said radiation in one of said arms, balancing photo-conductive means in an adjacent arm, said balancing photo-conductive means and said subject photo-conductive means having a first junction (J3) which constitutes one of said output terminals, first impedance means and second impedance means in said other arms of said bridge, said impedance means having a second junction (J4) constituting said other conjugate output terminal, said first and second impedance means each having a third and a fourth junction (J1, J2) respectively with said subject photoconductive means and said balancing photo-conductive means respectively, said last-named junctions constituting said conjugate input terminals, amplifier means having input and output, means connecting said first junction (J3) to said input, means connecting said output to said conjugate input terminals (PA, NA), the feedback from said output of said amplifier means to said first junction through said network being set so that the potential of said last-named junction remains substantially constant, means including said balancing photo-conductive means responsive to a difference of potential between said first junction and said second junction for reducing said difference to balance said network, and means responsive to potential changes at said second junction for indicating said temperature.

15. Apparatus for determining the temperature of a body from the optical radiation emitted thereby comprising a bridge network having photo-sensitive means in one arm thereof and impedances in other arms thereof, means connected to said impedances for balancing said bridge statically and for changes occurring at a relatively low rate, filter means for impressing pulses of the radiation in at least two wavelength bands emitted by said body alternately on said photo-sensitive means to unbalance said bridge momentarily on the impressing of said pulses, and means responsive to the ratio of the amplitude of the output of said bridge during unbalance when a pulse of one band is impressed to the amplitude of the output of said bridge during unbalance when a pulse of the other band is impressed to indicate the temperature to be determined.

16. A plural wavelength pyrometer in which the temperature of a body is determined from measurement of the intensity of the optical radiation from said body in at least two wavelength bands of the emission spectrum of said body, the said pyrometer including amplifier means, having an output, and responsive to said radiation for producing an indication of said temperature, the said pyrometer being characterized by that the difference between wavelengths characterizing the said two bands is as small as practicable consistent with the capability of said amplifier means to produce a measurable indication of the difference of the response of said amplifier to the radiation of said body in said two bands.

17. A plural-wavelength pyrometer for determining the temperature of a body from the optical radiation emitted by said body over at least two wavelength bands of said radiation, said pyrometer including radiation-responsive means successively responsive to said radiation in said two wavelengths for indicating said temperature, the said pyrometer being characterized by means connected to said radiation-responsive means for maintaining said radiation-responsive means at a substantially constant temperature.

18. Apparatus for determining the temperature of a body emitting optical radiation characteristic of said temperature, comprising means for deriving from said body first radiation in a first wavelength band and second radiation in a second wavelength band, impedance means, photo-conductive means, filter means for subjecting said photo-conductive means to said first radiation, and said second radiation in succession, means connecting said impedance means and said photo-conductive means in series in a bridge network having conjugate input and output terminals, the junction (J3) of said impedance means and said photo-conductive means constituting one of said output terminals, and the other terminals (J1, J2) respectively of said impedance means and said photo-conductive means constituting said conjugate input terminals, amplifier means having an input circuit and an output circuit, means connecting said junction to said input circuit, means connecting said amplifier means in a first feedback loop (A2, Red Pulse Separator, A4, NA) including the pair consisting of said impedance means and said photo-conductive means, said first feedback loop being set to maintain the output at said output circuit resulting from said first radiation constant independently of the intensity of said first radiation, means connecting said amplifier means in a second feedback loop (PA, Cell, J3) including the other of said pair, said second feedback loop being set to maintain the current through said last-named other means constant for different conductivities of said photo-conductive means at any voltage impressed on said photo-conductive means by said first loop, and compensating means (LA, R2) connected to said impedance means for suppressing from said network fluctuations arising in said first feedback loop as a result of the effects of said first and second radiation on said photo-conductive means.

19. Apparatus for determining the temperature of a body comprising photo-sensitive means filter, means for subjecting said photo-sensitive means to optical radiation from said body in a first wavelength band and in a second wavelength band, means connected to said photo-sensitive means for deriving therefrom a signal substantially proportional to the ratio of the response of said photo-sensitive means to the radiation in said first band and the response of said photo-sensitive means to the radiation in said second band, and means responsive to the intensity of the radiation from said body for automatically limiting the radiation impinging on said photo-sensitive means to a relatively narrow range over which said photo-sensitive means responds effectively.

No references cited.

RONALD L. WIBERT, Primary Examiner

O. B. CHEW, Assistant Examiner

U.S. Cl. X.R.

73—355